United States Patent
Bauspies

[15] 3,683,861
[45] Aug. 15, 1972

[54] FEEDING BOWL
[72] Inventor: Robert O. Bauspies, Holland, Mich.
[73] Assignee: Maes Incorporated, Holland, Mich.
[22] Filed: Jan. 11, 1971
[21] Appl. No.: 105,557

[52] U.S. Cl. .................................. 119/61, 220/74
[51] Int. Cl. ........................................ A01k 05/00
[58] Field of Search .............. 119/61, 51; 220/74

[56] References Cited

UNITED STATES PATENTS

| 269,814 | 12/1882 | Rice | 220/74 |
| 1,112,943 | 10/1914 | Stone | 220/74 X |
| 1,909,244 | 5/1933 | Ahlman | 119/61 |
| 3,205,861 | 9/1965 | Moore | 119/61 |

Primary Examiner—Hugh R. Chamblee
Attorney—Woodhams, Blanchard and Flynn

[57] ABSTRACT

A one-piece plastic receptacle having a substantially rectangular upper edge and four integral rim elements hingedly secured along said upper edge for movement into coplanar positions along said edge. Connecting means secures said rim elements in said positions and means is provided for mounting the receptacle to an upright support.

4 Claims, 6 Drawing Figures

INVENTOR
ROBERT O. BAUSPIES
BY
Woodhams, Blanchard & Flynn
ATTORNEYS

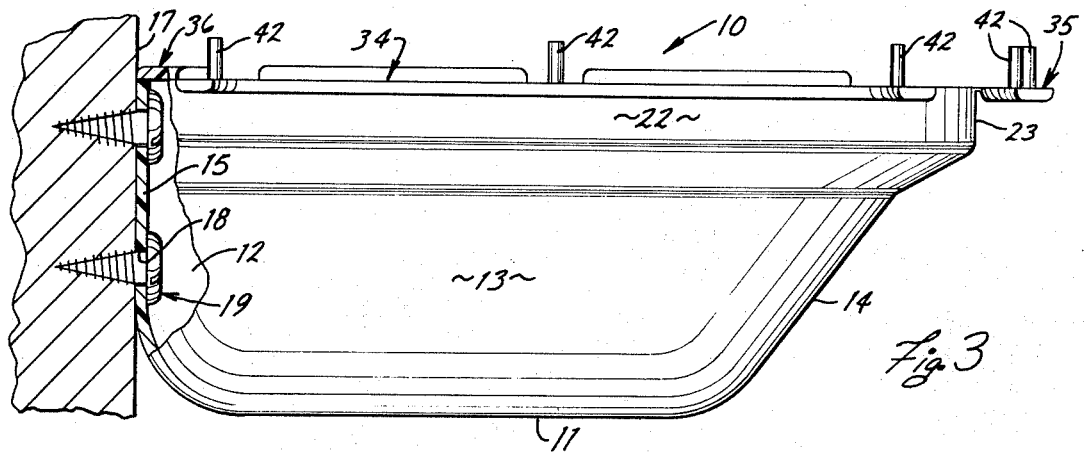
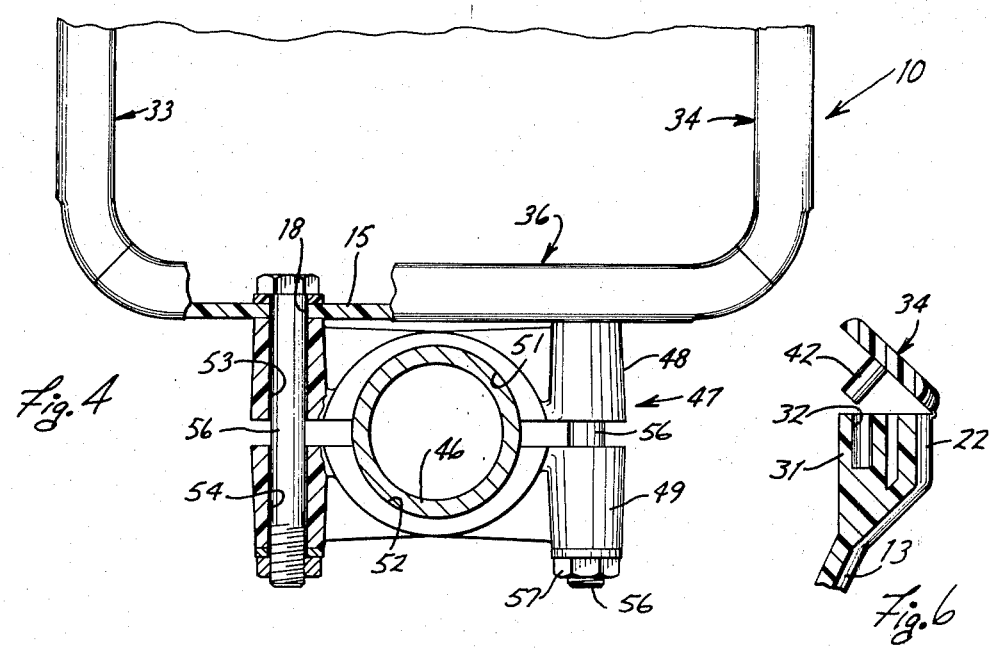
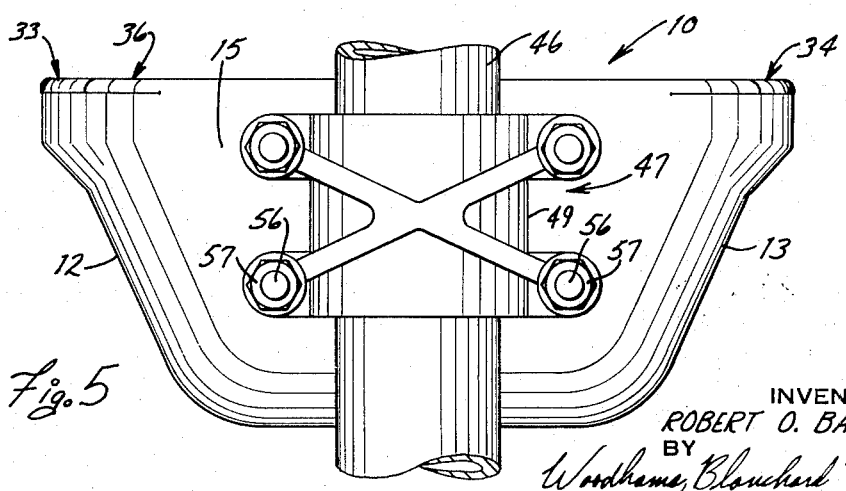
INVENTOR
ROBERT O. BAUSPIES
BY
Woodhams, Blanchard & Flynn
ATTORNEYS

FEEDING BOWL

BACKGROUND OF THE INVENTION

Persons familiar with the care and feeding of animals are aware that the grass, straw, corn, oats and similar foods fed to livestock, for example, must be supplemented in order to produce the best meat or milk products. Among such supplements are salt and certain other granular feeds which are fed to the animals at intervals and in relatively small amounts. Usually, the animal will avail himself of these supplements if they are made readily accessible, such as in a container located in a convenient position and at a convenient level within the animal's pen or stall. By placing the supplementary feed in small containers in this manner, the person supplying the feed can determine whether it is being taken by the animal and can control the amount so taken.

In the past, the supplementary feeds have been merely placed within a convenient container designed for some other purpose. That is, the container may have been a saucer taken from a farmer's kitchen or a small wooden box hastily prepared from available materials. Such containers have no accurate means of indicating their capacity, or they are easily broken, or they are easily corroded or eroded and thus contaminated by the very ingredients which are placed in them. Moreover, these containers are not often equipped with means for mounting them upon an upright member and, accordingly, they must be placed upon a box or a stool or merely on the ground where they are easily tipped, spilled and/or broken.

In the course of developing a suitable, plastic feeding bowl, it was found desirable to provide a stiffened rim in order to take advantage of relatively thin and inexpensive sidewalls. Also, it was found helpful to furnish the bowl with a rim which projected inwardly of the sidewalls to prevent the animal from accidentally removing feed, as by its tongue or nose, that it did not ingest. At first, such a rim seemed to present an insurmountable obstacle to an inexpensive molding operation.

Accordingly, a primary object of this invention is the provision of receptacle means which is adapted for mounting upon an upright member such as a wall or post, which is fabricated in one piece from plastic and which is shaped for convenient and controlled use by an animal.

A further object of this invention is the provision of receptacle means, as aforesaid, having four integral rim elements hingedly secured along the upper edge of the receptacle and movable between easily moldable positions and receptacle stiffening positions.

A further object of this invention is the provision of a receptacle, as aforesaid, which is easy to clean, which resists contamination and which can be manufactured inexpensively.

Other objects and purposes of this invention will become apparent to persons familiar with this type of device upon reading the following descriptive material and examining the accompanying drawings, in which:

FIG. 3 is a broken side elevational view of said receptacle means of FIG. 1.

FIG. 4 is a broken fragment of a top plan view of the assembled receptacle means along with bracket means for mounting same upon an upright post.

FIG. 5 is a rear elevational view of the receptacle means of the invention in mounted position upon an upright post.

FIG. 6 is a sectional view taken along the line VI—VI in FIG. 1.

Figure 1:
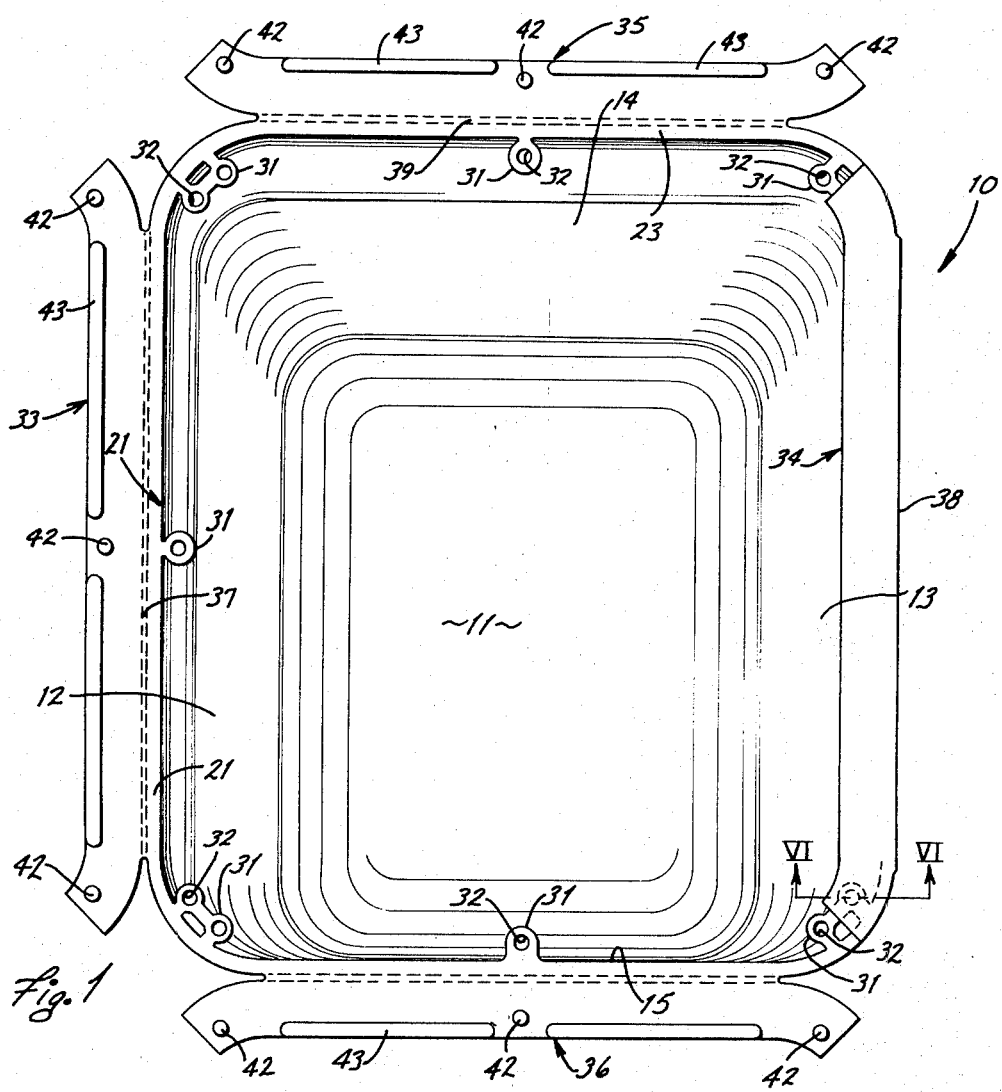
FIG. 1 is a top plan view of receptacle means embodying the invention in a partially assembled condition.

For convenience in description, the terms "upper," "lower," "front," "rear" and words of similar import will have reference to the receptacle of the invention as appearing in FIG. 5 which illustrates the rear view. The terms "inner," "outer" and derivatives thereof will have reference to the geometric center of said receptacle and part thereof.

SUMMARY OF THE INVENTION

The objects and purposes of the invention, including those set forth above, have been met by providing a one-piece, molded plastic receptacle having hinged rim elements which are movable into coplanar positions where they are held to stiffen the upper edge of the receptacle. Bracket means is furnished to mount the receptacle upon an upright post, but the receptacle can alternatively be mounted upon the surface of a wall.

DETAILED DESCRIPTION

A one-piece plastic bowl or receptacle 10 for feeding animals comprises a cup member having a bottom wall 11 and, in this embodiment, four upstanding walls 12, 13, 14 and 15 integrally secured to the bottom wall. The connections between the walls are curved to facilitate molding and cleaning. The sidewalls 12 and 13 diverge upwardly (FIG. 5), the rear wall 15 is vertical and the front wall 14 is inclined outwardly and upwardly, as illustrated in FIG. 3. The rear wall 15 is preferably vertical to facilitate securement of the receptacle in a horizontal position to a supporting surface 17. More specifically, the rear wall 15 has a plurality of holes 18 through which screws 19 are received for securing the receptacle 10 to the supporting surface 17.

Figure 2:
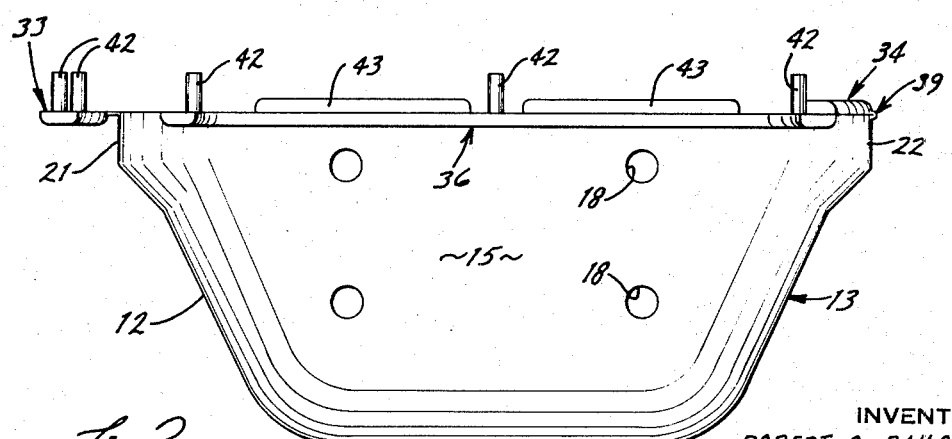
FIG. 2 is a rear elevational view of the receptacle means appearing in FIG. 1.

The upper edge portions 21, 22 and 23 (FIGS. 2 and 3) of the walls 12, 13 and 14 are offset away from the center of the receptacle 10 to strengthen said walls.

A plurality of integral abutments 31 are integral with the inner surfaces of the upper edge portions of the walls 12, 13, 14 and 15 preferably in the regions of their interconnection and about midway therebetween. Each of the abutments 31 has at least one upwardly opening socket 32.

Four elongated rim elements 33, 34, 35 and 36 are secured by integral hinge connections 37, 38, 39 and 40, respectively, to the upper edges of the walls 12, 13, 14 and 15. Each of the elongated rim elements 33, 34, 35 and 36 has a plurality of projections 42 extending perpendicularly from its upper surface, as appearing in FIG. 2 with respect to the elements 33 and 36. The projections 42 are located in preselected positions relative to their respective hinge connections 37, 38, 39 or 40, and relative to the locations of the sockets 32 in the abutments 31. As a result, movement of the rim elements 33, 34, 35 and 36 about their hinge connection into coplanar positions, as shown in FIG. 5, will cause each of the projections 42 to enter one of the sockets 32 and thereby firmly hold the rim elements in said coplanar positions wherein they project inwardly from said walls and over the opening into the receptacle, partially covering same. The rim elements thusly rigidify the upper edges of the cup member defined by said walls.

A plurality of elongated ribs 43 are integral with each of the rim elements adjacent the edges thereof remote from the hinge connection to strengthen said rim elements.

It will be noted (FIG. 6) that, as the projections 42 approach the sockets 32 the central axes thereof are not aligned and, therefore, one or both must be distorted or flexed considerably during the complete insertion of the projections 42 into the sockets 32. This is made possible by the resilient flexibility of the plastic material selected for the receptacle 10. However, the same difficulty which is encountered during movement of the rim elements into their assembled positions of FIG. 5 also serves to releasably lock said rim elements in said assembled positions.

By hingedly connecting the rim elements 33, 34, 35 and 36 to the upper edges of the walls 12, 13, 14 and 15, the entire receptacle 10 can be injection molded, for example, easily in one piece with said rim elements in their outwardly projecting, coplanar positions, as appearing in FIG. 1 with respect to the rim elements 33, 35 and 36. On the other hand, the cost of molding the receptacle 10, with the rim elements disposed in their final assembled positions of FIG. 5, would be prohibitive The receptacle 10 (FIGS. 4 and 5) may also be secured to an upstanding post 46 through an adaptor bracket 47, which has a pair of preferably identical clamp members 48 and 49. The clamp member 48 has a concave, semicylindrical surface 51 of substantially the same radius as that of the upstanding post 46. The clamp member 49 has a concave surface 52 identical to that of the clamp 48, whereby the post 46 can be embraced by the surfaces 51 and 52. The clamp members 48 and 49 have plural bolt openings 53 and 54, respectively, which are adjacent said surfaces 51 and 52, and which are alignable with each other and, at the same time, with the openings 18 in the rear wall 15 of the receptacle 10. Bolts 56 are receivable through the openings 18, 53 and 54 for engagement by nuts 57 for securing the clamp members 48 and 49 together and thereby supporting the receptacle 10 upon the post 46.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A receptacle mountable upon an upright member for feeding animals, comprising:
    plastic cup means rear wall means and an upper edge substantially defining a rectangle;
    plural, elongated rim elements hingedly and integrally secured to said cup means adjacent said upper edge thereof, said rim elements extending along said upper edge and being movable into and out of substantially coplanar positions projecting laterally inwardly from said upper edge;
    means for holding said rim elements in said positions wherein said elements define a substantially continuous rim around said cup means; and
    mounting means adapted to secure said rear wall means to said upright member.

2. A receptacle according to claim 1 wherein said cup means and said rim elements are molded in one piece with said rim elements being coplanar and extending away from said cup means; and
    wherein one rim element extends along each edge of said rectangle.

3. A receptacle according to claim 1 wherein said means securing said rim elements to said cup means comprises means defining a plurality of sockets in one thereof and a plurality of projections on the other thereof snugly receivable into said sockets.

4. A structure according to claim 1 wherein said mounting means comprises a pair of similar clamp members having concave, semicylindrical surfaces of substantially the same radius on one side of each for engagement with a corresponding surface on said upright member, each clamp member having a plurality of parallel bolt openings disposed radially outwardly of said semicylindrical surface, said bolt openings being substantially perpendicular to a plane defined by the opposite axial edges of the semicylindrical surface;
    wherein said rear wall has a plurality of openings therethrough and alignable with the openings in said clamp members; and
    a plurality of bolts and cooperating nuts, said bolts being simultaneously extendible through the openings in said rear wall and said clamp members for securing said receptacle upon said upright member.

* * * * *